United States Patent Office 2,704,271
Patented Mar. 15, 1955

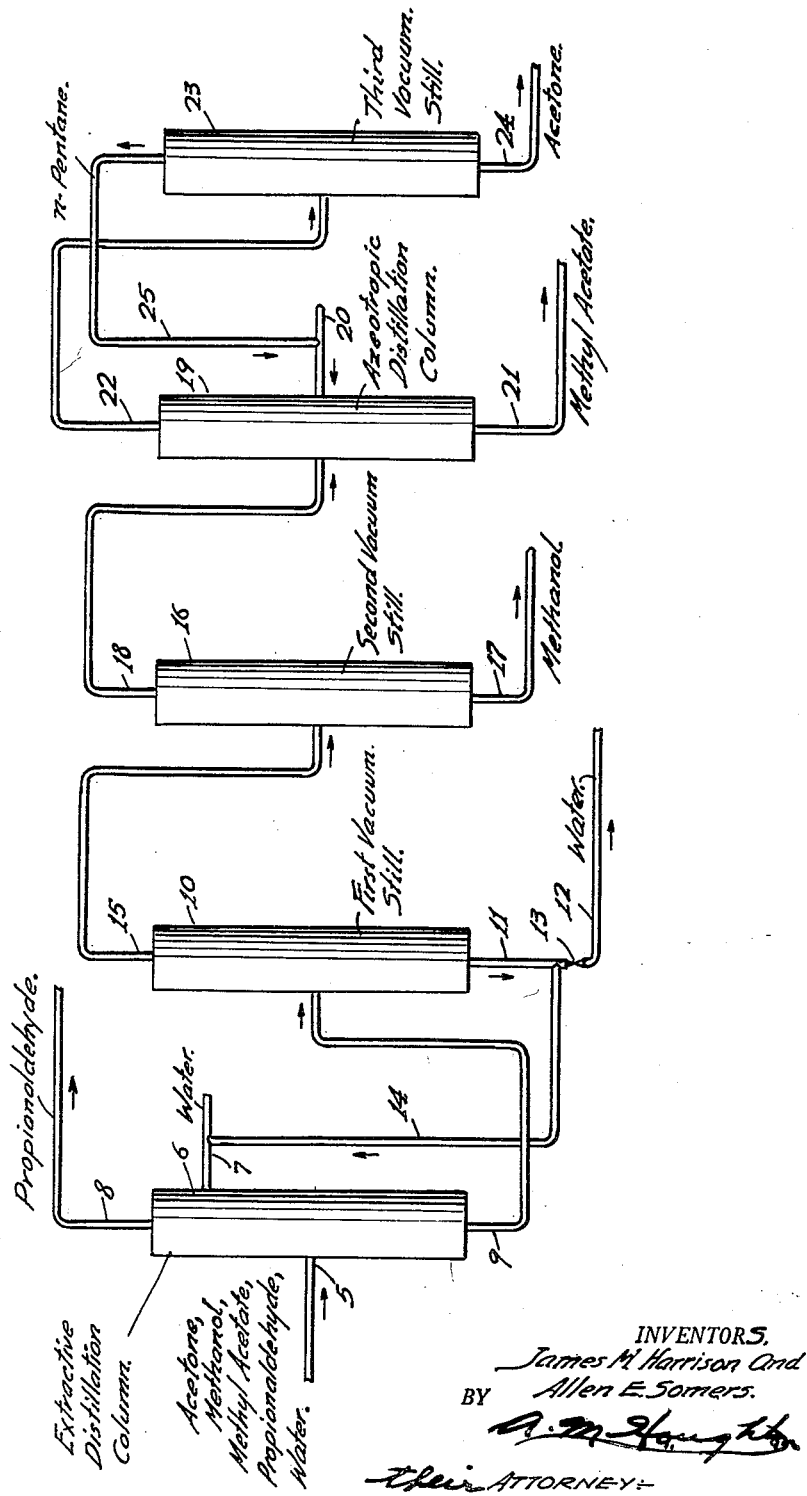

2,704,271
PROCESS OF SEPARATING ORGANIC MIXTURES

James M. Harrison, Oakmont, and Allen E. Somers, Pittsburgh, Pa., assignors to Gulf Research & Development Company, Pittsburgh, Pa., a corporation of Delaware Application March 14, 1952, Serial No. 276,613

6 Claims. (Cl. 202—39.5)

This invention relates to a process for separating aqueous and nonaqueous mixtures of lower molecular weight oxygenated organic compounds and more particularly, to a process for separating aqueous or nonaqueous mixtures of acetone, methanol, methyl acetate and propionaldehyde.

A mixture of acetone, methanol, methyl acetate, propionaldehyde and water is produced during the separation of a Fischer-Tropsch oxygenated product into its constituents. Fischer-Tropsch oxygenated products originally contain alcohols, acids, aldehydes, ketones, and esters which vary in chain length from $C_1$ to $C_{20}$ or higher. Fischer-Tropsch products can be separated by distillation into a number of compounds and groups of compounds. For example, a Fischer-Tropsch product can be divided into a water-soluble phase containing the lower molecular weight organic compounds and an oil-soluble phase containing higher molecular weight organic compounds. The water-soluble phase or water phase can be further divided by distillation and in so doing, a group of compounds containing acetone, methanol, methyl acetate, propionaldehyde and water is produced.

It is difficult to separate this group of compounds because the boiling points of the various constituents of the mixture are within a narrow range, because the various compounds form a number of azetropes with each other and because the constituents may oxidize, polymerize, and react with one another. It is particularly difficult to remove propionaldehyde because it readily undergoes all three types of reactions mentioned. Propionaldehyde is easily oxidized to acids, it polymerizes in the presence of mineral acids, and it reacts with alcohols in acid solutions to form acetals. It is desirable to separate this group of compounds in order to obtain the components as substantially pure products.

We have found that a mixture of acetone, methanol, methyl acetate and propionaldehyde which is free of water or which contains water can be efficiently separated by first introducing the mixture into an extractive distillation zone into which water is also introduced as the extractant while maintaining the vapor temperature, the reflux ratio and the concentration of the water in the extractive distillation zone at values such that the overhead is substantially pure propionaldehyde. We have found that vapor temperatures of 48.9° to 49.4° C., a reflux ratio of above about 3.5:1, and a concentration of water in the extractive distillation zone of 87 to 89 volume per cent are effective for the production of substantially pure propionaldehyde.

We have further found that the resulting mixture of acetone, methanol, methyl acetate and water can be separated by removing water as bottoms in a first distillation zone; removing methanol as bottoms from the resulting mixture of acetone, methanol, and methyl acetate in a second, reduced pressure, distillation zone at a pressure below about 2 p. s. i. a. and preferably at about 0.6 p. s. i. a.; removing methyl acetate as bottoms from the resulting mixture of acetone and methyl acetate in an azeotropic distillation zone by introducing n-pentane as an azeotrope former and removing as overhead an azeotropic mixture of acetone and n-pentane containing about 20 weight per cent acetone and about 80 per cent n-pentane and having a boiling point of 32.5° C. at 760 mm. of Hg; and separating acetone from the azeotropic mixture of acetone and n-pentane. We have further found that acetone can preferably be separated from the azeotropic mixture of acetone and n-pentane by passing the azeotropic mixture of acetone and n-pentane to a third reduced pressure distillation zone at a pressure below about 2.5 p. s. i. a. and preferably at about 1.3 p. s. i. a., removing n-pentane overhead and acetone as bottoms from the third, reduced pressure, distillation zone. The n-pentane may be recycled to the azeotropic distillation zone.

The pressure employed in the distillation zone for separating water from a mixture of acetone, methanol, methyl acetate, and water depends upon the composition of the mixture. Methyl acetate forms an azeotrope with water with a boiling point of 56.5° C. at 760 mm. of Hg. Methyl acetate also forms other azeotropes with one or both of acetone and methanol having lower normal boiling points. When all of the methyl acetate is removed as part of one or more of these azeotropes, atmospheric pressure is employed in the first distillation zone used for recovering water from a mixture of acetone, methanol, methyl acetate, and water. When, however, all of the methyl acetate is not removed as part of the azeotropes having a lower normal boiling point than 56.5° C., a reduced pressure below about 10 pounds per square inch absolute is employed because the azeotrope of methyl acetate and water does not form below this pressure.

A reduced pressure is employed in the second reduced pressure distillation zone and in the third reduced pressure distillation zone in order to obtain methanol and acetone, respectively, as bottoms and to obtain the overhead from each of these distillation zones free of these compounds.

The separation of propionaldehyde from a mixture of acetone, methanol, methyl acetate and propionaldehyde is efficiently accomplished by subjecting the mixture to an extractive distillation with water in accordance with the process of our invention. The results of extractively distilling a mixture containing 40 weight per cent propionaldehyde and 20 weight per cent of each of acetone, methanol, and methyl acetate are given in Table I which follows:

TABLE I

Results of extractive distillation of a mixture of propionaldehyde, acetone, methanol, and methyl acetate with water

EXTRACTION CONDITIONS

|  | Reflux Ratio | Parts by Volume | | Concentration of water in Column, Vol. Percent | Overhead [1] Refractive Index $n_D^{22}$ |
|---|---|---|---|---|---|
|  |  | Overhead | Bottoms |  |  |
| Run A | 6:1 | 48 | 980 | 88 | 1.3635 |
| Run B | 5:1 | 52 | 940 | 87 | 1.3635 |
| Run C | 3.5:1 | 56 | 1,115 | 90 | 1.3634 |

[1] Propionaldehyde refractive index—$n_D^{22}$—1.3635

It will be observed from the refractive index data that the overhead from each of the runs is substantially pure propionaldehyde.

The process of our invention can best be understood by reference to the accompanying drawing, the single figure of which shows a flow sheet of apparatus suitable for carrying out an embodiment of our invention. For the sake of simplicity, check valves, pressure and temperature control equipment, refrigeration equipment for the vacuum columns, and other auxiliary equipment well-known to those skilled in the art, have not been shown on the figure.

Referring to the figure, a mixture containing 200 parts acetone, 200 parts methanol, 100 parts methyl acetate, 400 parts propionaldehyde, and 10 parts water is introduced by means of line 5 to the extractive distillation column 6. 4500 parts of water recycled as described below are introduced into extractive distillation column 6 by line 7. 400 parts of propionaldehyde are removed overhead from extractive distillation column 6 by line 8, and a mixture containing 200 parts methanol, 200 parts acetone, 100 parts methyl acetate and 4510 parts water is removed as bottoms by line 9. The mixture of acetone, methanol, methyl acetate and water is introduced by line 9 into first vacuum still 10 which is operated at a pressure of about 8 p. s. i. a. 4510 parts of water are removed as bottoms from first vacuum still 10 by line 11, 10 parts are discharged as waste by line 12 containing valve 13 and 4500 parts of water are recycled by lines 14 and 7 to extractive distillation column 6. A mixture containing 200 parts methanol, 200 parts acetone, and 100 parts methyl acetate is removed overhead from first vacuum still 10 by line 15.

The mixture of acetone, methanol and methyl acetate is introduced by line 15 into second vacuum still 16 which is operated at a pressure of about 0.6 p. s. i. a. 200 parts of methanol are removed as bottoms from the second vacuum still 16 by line 17 and are discharged as product. A mixture containing 200 parts acetone and 100 parts methyl acetate is removed overhead from the second vacuum distillation still 16 by line 18.

The mixture of acetone and methyl acetate is introduced by line 18 into azeotropic distillation column 19. 800 parts of n-pentane recycled as described below are introduced into azeotropic distillation column 19 by line 20. 100 parts of methyl acetate are removed as bottoms from azeotropic distillation column 19 by line 21 and are discharged as product. An azeotropic mixture containing 200 parts acetone and 800 parts n-pentane and having a boiling point of 32.5° C. at 760 mm. of Hg is removed overhead from azeotropic distillation column 19 by line 22 and is introduced into third vacuum still 23 which is operated at a pressure of about 1.3 p. s. i. a. 200 parts of acetone are removed as bottoms from third vacuum still 23 by line 24 and are discharged as product and 800 parts of n-pentane are removed overhead from vacuum still 23 by line 25 and are recycled to azeotropic distillation column 19 by lines 25 and 20.

Obviously many modifications and variations of the invention as hereinbefore set forth may be made without departing from the spirit and scope thereof and therefore only such limitations should be imposed as are indicated in the appended claims.

We claim:

1. A process which comprises introducing a mixture of acetone and methyl acetate to a distillation zone, adding n-pentane as an azeotrope former, removing an azeotrope of acetone and n-pentane having a boiling point of about 32.5° C. at 760 mm. of Hg overhead, passing said azeotropic mixture of acetone and n-pentane to a reduced pressure distillation zone at a pressure below about 2.5 p. s. i. a., and removing acetone as bottoms and n-pentane as overhead from said reduced pressure distillation zone.

2. A process which comprises introducing water and a mixture of acetone, methanol, methyl acetate and propionaldehyde into a water extractive distillation zone; removing propionaldehyde overhead from said water extractive distillation zone; removing water as bottoms from the resulting mixture of acetone, methanol, methyl acetate and water in a first distillation zone; removing methanol as bottoms from the resulting mixture of acetone, methanol, and methyl acetate in a second, reduced pressure, distillation zone at a pressure below about 2 p. s. i. a.; removing methyl acetate as bottoms from the resulting mixture of acetone and methyl acetate in an azeotropic distillation zone by introducing n-pentane as an azeotrope former and removing an azeotropic mixture of acetone and n-pentane; and separating acetone from the azeotropic mixture of acetone and n-pentane.

3. A process which comprises introducing water and a mixture of acetone, methanol, methyl acetate and propionaldehyde into an extractive distillation zone; removing substantially pure propionaldehyde overhead and a mixture of acetone, methanol, methyl acetate and water as bottoms from said extractive distillation zone; passing the mixture of acetone, methanol, methyl acetate and water to a first distillation zone at a pressure below about 10 p. s. i. a.; removing water as bottoms and a mixture of acetone, methanol and methyl acetate as overhead at a temperature of about 60° C. from the first distillation zone; introducing the mixture of acetone, methanol and methyl acetate into a second, reduced pressure, distillation zone at a pressure below about 2 p. s. i. a.; removing methanol as bottoms and a mixture of acetone and methyl acetate as overhead from said second, reduced pressure, distillation zone at a temperature of about −10° C., introducing the mixture of acetone and methyl acetate to an azeotropic distillation zone; introducing n-pentane as an azeotrope former into said azeotropic distillation zone, removing methyl acetate as bottoms from said azeotropic distillation zone; and removing an azeotropic mixture of acetone and n-pentane overhead from said azeotropic distillation zone, said azeotropic mixture containing about 20 weight per cent acetone and about 80 weight per cent n-pentane.

4. A process which comprises introducing water and a mixture of acetone, methanol, methyl acetate and propionaldehyde into a water extractive distillation zone; removing propionaldehyde overhead from said water extractive distillation zone; removing water as bottoms from the resulting mixture of acetone, methanol, methyl acetate and water in a first reduced pressure distillation zone at a pressure below about 10 p. s. i. a.; removing methanol as bottoms from the resulting mixture of acetone, methanol, and methyl acetate in a second reduced pressure distillation zone at a pressure below about 2 p. s. i. a.; removing methyl acetate as bottoms from the resulting mixture of acetone and methyl acetate in an azeotropic distillation zone by introducing n-pentane as an azeotrope former and removing an azeotropic mixture of acetone and n-pentane containing about 20 per cent acetone and about 80 per cent n-pentane; passing said azeotropic mixture of acetone and n-pentane to a third reduced pressure distillation zone at a pressure below about 2.5 p. s. i. a.; and removing acetone as bottoms and n-pentane as overhead from said third reduced pressure distillation zone.

5. A process which comprises introducing a mixture of acetone, methanol, methyl acetate, and propionaldehyde into an extractive distillation zone; introducing water into said extractive distillation zone at a rate such that the water concentration within the column is within the range of 87 to 90 per cent; adjusting the reflux ratio to said extractive distillation zone above about 3.5:1; removing substantially pure propionaldehyde overhead from said extractive distillation zone; introducing the resulting mixture of acetone, methanol, methyl acetate and water into a first reduced pressure distillation zone at a pressure below about 10 p. s. i. a.; removing water from the first reduced pressure distillation zone as bottoms; passing the resulting mixture of acetone, methanol, and methyl acetate into a second reduced pressure distillation zone at a pressure below about 2 p. s. i. a.; removing methanol as bottoms from said second reduced pressure distillation zone; passing the resulting mixture of acetone and methyl acetate overhead from said second reduced pressure distillation zone at a temperature of about −10° C. and introducing said mixture into an azeotropic distillation zone; introducing n-pentane as an azeotrope former into said azeotropic distillation zone; removing methyl acetate as bottoms and an azeotropic mixture of acetone and n-pentane as overhead from said azeotropic distillation zone, said azeotropic mixture of acetone and n-pentane containing about 20 per cent acetone and about 80 per cent n-pentane and having a boiling point of 32.5° C. at 760 mm. of Hg; passing said azeotropic mixture of acetone and n-pentane to a third reduced pressure distillation zone at a presure below about 2.5 p. s. i. a.; and removing acetone as bottoms and n-pentane as overhead from said third reduced pressure distillation zone.

6. In a process for the separation of a mixture of propionaldehyde, acetone, methyl acetate, methanol, and water into its separate components, the steps of subjecting the mixture to an extractive distillation, adding water to the mixture as an extractive solvent in said extractive distillation in an amount to provide a water concentration of the order of about 87% in the extractive distillation, withdrawing propionaldehyde as an overhead product from the extractive distillation, and discharging a solution of acetone, methyl acetate, methanol and water as a bottoms product from the distillation.

References Cited in the file of this patent

UNITED STATES PATENTS

| | | |
|---|---|---|
| 1,676,700 | Lewis | July 10, 1928 |
| 2,198,651 | Bludworth | Apr. 30, 1940 |
| 2,321,748 | Hopkins | June 15, 1943 |
| 2,477,087 | Robertson | July 26, 1949 |
| 2,514,966 | Pierotti et al. | July 11, 1950 |
| 2,607,719 | Eliot et al. | Aug. 19, 1952 |

OTHER REFERENCES

Horsley, Table of Azeotropic Data, Analytical Chemistry, vol. 19, August 1947, pages 537, 538, 539.